United States Patent Office 3,281,209
Patented Oct. 25, 1966

3,281,209
PROCESS FOR THE PRODUCTION OF HYDROXYL-AMINE-O-SULPHONIC ACID
Herbert L. Wehrmeister and Harold I. Yalowitz, Terre Haute, Ind., assignors to Commercial Solvents Corporation, a corporation of Maryland
No Drawing. Filed May 28, 1964, Ser. No. 371,115
18 Claims. (Cl. 23—166)

The present invention relates to the preparation of hydroxylamine-O-sulphonic acid in high yields by contacting hydroxylammonium sulphate, prepared in situ from nitromethane, with sulphur trioxide.

Hydroxylamine-O-sulphonic acid, $H_2N-O-SO_3H$, is a very reactive compound capable of giving hydrazine by reaction with ammonia, and substituted hydrazines by reaction with amines. Other interesting and valuable reactions are known. In some respects, hydroxylamine-O-sulphonic acid is analogous to chloramine.

Hydroxylamine-O-sulphonic acid has been prepared (1) by heating a mixture of a hydroxylammonium salt with an excess of chlorosulphonic acid for several hours at 100° C., (2) by allowing hydroxylammonium sulphate to react with fuming sulphuric acid at room temperature, and (3) by bubbling gaseous hydrogen azide through fuming sulphuric acid maintained at 60° to 80° F.

The second method is most commonly used. The yields of product, however, are predictated on the use of hydroxylammonium sulphate as a starting material having a high degree of purity. The use of hydroxylammonium sulphate as a starting material has a serious cost drawback because of isolation problems. Additionally, this process requires a large quantity of strong sulphuric acid as the reaction medium, for instance a weight ratio of sulphuric acid to product of about 2.65:1. When using this process, the product is purified by washing it with ethyl ether which can be hazardous.

It has now been surprisingly found that hydroxylamine-O-sulphonic acid (HOS) may be expeditiously obtained in high yields, e.g. as high as about 84%, with high purities, e.g. as high as about 99%, and in crystalline form. This is accomplished by a "one-pot reaction" (i.e. use of the same medium and same equipment for the production of HOS from HAS and HAS from nitromethane) in which HAS (hydroxylammonium acid sulphate), prepared in situ from nitromethane, is converted to the desired product through reaction with sulphur trioxide without purification of the hydroxylammonium acid sulphate intermediate and without the disadvantages of the known processes described above. The present process is particularly advantageous in that it is more easily adaptable for commercial production. The quantity of sulphuric acid reaction medium used in the new and improved process can be small. This alleviates to some degree one of the major disadvantages of process (2) above since sulphuric acid is deleterious to the production of good yields and pure HOS and since efforts to find a substitute for the sulphuric acid diluent medium have been essentially unsuccessful in that the yields were low and the products were gummy. The quantity of strong sulphuric acid to be handled from a weight ratio of sulphuric acid to product (HOS) may be reduced when using the present invention from approximately 2.65:1 to, for instance, approximately 1.46:1. Although this ratio may go as high as desired there is no advantage in going beyond the minimum amount of acid required and it is preferred to maintain the ratio close to 1.5:1 to avoid the difficulties experienced in handling more acid. The weight ratio of acid to HOS in accordance with the present invention may be generally maintained between 3 to 1.5:1.

It has also been surprisingly found that ethyl acetate can be used to wash the HOS product free of sulphuric acid and other impurities. The use of ethyl acetate is a major advantage over the use of ethyl ether, for instance, since recoveries of pure ethyl acetate of up to about 80% or more may be realized using simple distillation procedures and at the same time the hazards associated with the handling of ether are eliminated. The hydroxylamine-O-sulphonic acid is comparatively insoluble in a cold slurry of ethyl acetate and the reaction mixture.

The hydroxylamine-O-sulphonic acid product produced by the process of the instant invention is in an easily handled crystalline form and is stable for long periods of time, e.g. several months, if it is stored in a moisture-free atmosphere. The present invention is preferably conducted under essentially anhydrous conditions in all steps of the process to insure the production of good yields and products of good purity, and the product should be protected from moisture. It has been observed that pure crystalline HOS is less susceptible to reaction with moist air than is an impure product containing greater amounts of free sulphuric acid.

Generally, the present invention involves reacting substantially anhydrous sulphuric acid with nitromethane to produce a reaction mixture containing hydroxylammonium acid sulphate which is reacted in situ with the required amount of sulphur trioxide to produce hydroxylamine-O-sulphonic acid. The reaction of nitromethane and sulphuric acid is exothermic and the nitromethane is usually slowly added to a sulphuric acid reaction medium which is generally maintained at a temperature no greater than that required to maintain control of the reaction. Generally the nitromethane is employed in a mole ratio to the sulphuric acid of at least 1 to 1 to 1.5 to 1 with no particular advantage resulting in the use of more. An advantageous feature of the process resides in the substantially complete recovery of the unreacted nitromethane.

The minimum temperature for the reaction medium is that sufficient to produce a reaction. The temperature used is generally from about 75° to 140° C., preferably from about 90° to 100° C. This temperature is maintained on the reaction medium for a period of time, i.e. digestion period, sufficient to produce an intermediate reaction product which will react with sulphur trioxide to produce the hydroxylamine-O-sulphonic acid of high purity and in high yield. The length of this digestion period is generally from about 4 to 24 hours, and the reaction can be conducted overnight, e.g. 16 to 18 hours. There is some indication that even greater purities are obtained with longer reaction times.

The reaction medium is preferably about 100% sulphuric acid. A convenient method which may be used to produce the medium consists of adding about 0.18 to 0.19 mole of sulphur trioxide (e.g. "Sulfan B") to agitated 96% sulphuric acid containing about 0.8 mole of sulphuric acid and 0.18 mole of water. "Sulfan B" is a water-white liquid consisting of more than 99% $SO_3$ with a minor amount of sulphuric acid and stabilizing agent. Sulfan B is a product of the General Chemical Division of Allied Chemical and Dye Corporation.

Following the digestion period for the reaction of nitromethane with sulphuric acid, the unreacted nitromethane can be removed from the reaction medium by distillation, e.g. at atmospheric pressure with a maximum pot temperature of about 140° C., and the remaining reaction medium is cooled to generally from about 15 to 45° C., preferably to from about 30° to 40° C. Cooling of the reaction medium prior to the addition of sulphur trioxide to produce the hydroxylamine-O-sulphonic acid is desirable when using Sulfan B which has a boiling point of approximately 45° C.

The amount of nitromethane recovered in the distillation can be determined and the amount of sulphur trioxide to be added is calculated from the known amount of nitromethane reacted with the sulphuric acid. Care should be taken in adding the sulphur trioxide to prevent foaming in order to insure high yields. During the addition of sulphur trioxide, the temperature is generally maintained below about 55° C.

When the addition of sulphur trioxide is completed the temperature of reaction mixture is increased to enhance the conversion to HOS, e.g. preferably to about 95° C. for about 1.5 to 2 hours, while the mixture is thoroughly agitated. The mixture which may become stiff, softens with the application of heat. The reaction mixture is then rapidly cooled to a temperature low enough to obtain a proper crystalline material. Generally the temperature of the mixture is cooled to below 20° C., e.g. to from about −10° to +20° C. and preferably below 5° C. If the temperature goes too low, however, the mixture stiffens and renders recovery difficult.

The crystalline acid of the present invention can be recovered from the reaction mixture by adding ethyl acetate, preferably on about a volume to volume basis after cooling of the reaction mixture. More ethyl acetate can be used, however; there is no practical advantage to do so. The reaction mixture is a stiff mass at the commencement of the addition and requires the application of considerable torque in order to maintain agitation. The reaction medium is filtered cold, preferably with the complete exclusion of moisture, and the filter cake can be repeatedly washed with ethyl acetate as desired. At every step in the process of the present invention, care should be taken to minimize exposure to moist air.

The following examples serve to further illustrate the invention.

*Examples I through X*

The reactors used were 3-necked flasks equipped with an agitator in the center neck. Dropping funnels and plugs were provided for one outer neck to be used as required. The other neck was equipped with a Claissen-type adapter with a stopcock-controlled take-off tube in the throat of the parallel side arm for use during the distillation cycle. The take-off tube was fitted with a tared receiver. The upper end of the parallel side arm was equipped with an Allihn condenser which was topped with a Friedrich's condenser. The other neck of the adapter contained a long-stem thermometer to measure the pot temperature. Provision was made for heating with either a hot water bath or a heating mantle as conditions required. The size of the reactor varied from a 500 ml. flask for a run based on 2.7 moles of nitromethane to a 2-liter flask for a run using 9.6 moles of nitromethane.

The preferred procedure reduced to a size requiring one mole of 100% sulphuric acid reaction medium was as follows:

A 100% sulphuric acid reaction medium was prepared by adding, in the reactor, 0.18–0.19 mole of sulphur trioxide as Sulfan B to agitated 96% sulphuric acid containing 0.8 mole of sulphuric acid and 0.18 mole of water. The resulting medium was heated to about 95° and nitromethane (1.25 moles) was added dropwise into the agitated acid at such a rate that the pot temperature was maintained at 95–97°. This temperature was then maintained overnight (16–18 hours).

The unreacted nitromethane was distilled from the agitated reaction mixture at atmospheric pressure to a maximum pot temperature of 140°. The contents of the reactor were then cooled to 40°.

The amount of nitromethan (NM) recovered was determined and the amount of sulphur trioxide to be added was calculated according to the following formula:

$$\frac{\text{Wt. NM added} - \text{Wt. NM recovered} \times 88}{61 \times 1.922} = \text{ml. SO}_3 \text{ to add as Sulfan B}$$

The required amount of sulphur trioxide was added to the agitated reaction mixture over a 15 to 20 minute period, with the temperature increasing to a controlled maximum of 55° C. Towards the end of this addition, the mixture became very stiff and agitation was discontinued. When the addition of the sulphur trioxide was completed, the pot temperature was raised to 95° C. for 1.5–2 hours and agitation was resumed. The reaction mixture was then cooled rapidly to 0–4° C. and 155 mls. of pre-cooled pure ethyl acetate was added. The pot temperature was maintained at 10° C. or below during this addition. The reaction mixture is a very stiff mass at the commencement of the addition and requires the application of considerable torque in order to maintain agitation.

The reaction mixture was filtered cold with the substantially complete exclusion of moisture. The filter cake was then slurried with 130 mls. of pre-cooled ethyl acetate and filtered. The washing procedure was repeated two more times. The final filter cake was dried in a desiccator at full pump vacuum over 99% sulphuric acid. At every step, care was taken to minimize exposure to moist air.

The purity of the products was determined. Table I shows the results obtained from a number of runs prepared by the process described above:

TABLE I

| Example | Nitromethane | | Product | | | Percent Recovery Solvent pure |
|---|---|---|---|---|---|---|
| | Wt. Charged, g. | Wt. Recovered, g. | Wt. (g) | Percent Purity | Percent Yield | |
| I | 146.4 | 18.3 | 200.6 | 95.9 | 82.1 | |
| II | 146.4 | 21.3 | 197.1 | 95.9 | 78.9 | |
| III | 146.4 | 19.8 | 200.4 | 97.1 | 82.9 | |
| IV | 146.4 | 20.8 | 194.3 | 98.5 | 82.1 | 56.2 |
| V | 146.4 | 17.9 | 201.3 | 98.4 | 83.1 | 55.8 |
| VI | 146.4 | 19.1 | 198.1 | 85.5 | 71.5 | 72.0 |
| VII | 146.4 | 16.8 | 206.1 | 95.4 | 81.8 | 82.3 |
| VIII | 146.4 | 13.1 | 216.1 | 88.0 | 77.0 | 77.3 |
| IX | 146.4 | 16.4 | 211.3 | 95.4 | 83.6 | 73.9 |
| X | 585.6 | 78.2 | 807.7 | 96.5 (ave.) | 82.8 | 81.0 |

In some experiments, additional sulphuric acid (99%) was added to the slurry during the latter part of the sulphur trioxide addition period to permit continuous agitation. This was not very effectual and a significant increase in yield was noted when the sulphuric acid was not added.

*Example XI*

Nitromethane (4 moles) was added dropwise in 4 hours to a mixture of 246 gms. of 96% sulphuric acid and 148 gms. of 30% fuming sulphuric acid at a temperature of 117–133° C. The mixture was then cooled to 15° C. and 85 mls. of sulphur trioxide (Sulfan B) and 640 gms. of 30% fuming sulphuric acid were added. The temperature was kept below 50° C. during this one hour addition period. The mixture was then cooled to 5° C. and 500 mls. of cold anhydrous ethyl ether was added. The solid was collected by solid-liquid separation procedure, e.g. filtration and washed with 500 mls. and then 7 x 250 ml. of anhydrous ethyl ether. The filter cake (A) was stored in a vacuum desiccator. The filtrate contained some additional solid (B) which was collected, washed with a little ether, and stored in a vacuum desiccator also.

|   | Weight, g. | HOS Content, Percent |
|---|---|---|
| A | 277 | 82 |
| B | 135 | 64 |

The total yield of HOS was 70%.

What is claimed:

1. A process for the production of crystalline hydroxylamine-O-sulphonic acid comprising adding under substantially anhydrous conditions, nitromethane to sulphuric acid at a temperature and for a time sufficient to produce hydroxylammonium acid sulphate, contacting the resulting reacting mixture with sulphur trioxide to produce a second reaction mixture containing hydroxylamine-O-sulphonic acid, and recovering hydroxylamine-O-sulphonic acid from said second reaction mixture.

2. A process as defined in claim 1 wherein the recovery of the hydroxylamine-O-sulphonic acid comprises mixing a compound selected from the group consisting of ethyl ether and ethyl acetate with the reaction mixture containing hydroxylamine-O-sulphonic acid, and separating solid hydroxylamine-O-sulphonic acid.

3. A process as defined in claim 1 wherein sulphuric acid of about 100% concentration is used and said temperature is maintained between about 75° and 140° C.

4. A process as defined in claim 3 wherein said temperature is maintained for from about 4 to 24 hours.

5. A process as defined in claim 4 wherein the reaction mixture being contacted with sulphur trioxide is maintained at a temperature below about 55° C.

6. A process as defined in claim 5 wherein the reaction mixture contacted with sulphur trioxide is heated up to about 95° C. to enhance the production of hydroxylamine-O-sulphonic acid and produce a sulphuric acid product containing said acid.

7. A process as defined in claim 6 wherein the reaction containing the acid is rapidly cooled to a temperature between about −10° and +20° C. following said heating thereof.

8. A process as defined in claim 2 wherein the compound is ethyl acetate.

9. A process as defined in claim 1 wherein sulphuric acid of about 100% concentration is used, from about 1 to 1.5 moles of nitromethane are used per mole of sulphuric acid and sulphur trioxide is reacted with said resulting reaction mixture of the nitromethane-sulphuric acid reaction in a ratio of from about 1 to 2 moles of sulphur trioxide per mole of reacted nitromethane.

10. A process for the production of hydroxylamine-O-sulphonic acid comprising reacting, under essentially anhydrous conditions, nitromethane with sulphuric acid of about 100% concentration at a temperature between about 75° and 140° C. and maintaining said temperature for from about 4 to 24 hours to produce a first reaction mixture containing hydroxylammonium acid sulphate, removing unreacted nitromethane from said first reaction mixture and cooling the reaction mixture to a temperature of from about 15° to 45° C., reacting sulphur trioxide with the hydroxylammonium acid sulphate in said reaction mixture in a ratio of from about 1 to 2 moles sulphur trioxide per mole of hydroxylammonium acid sulphate present in said reaction mixture at a temperature below about 55° C. to produce a second reaction mixture contatining hydroxylamine-O-sulphonic acid, heating said second reaction mixture at a temperature up to about 95° C., thereafter rapidly cooling said second reaction mixture to a temperature between about −10° and +20° C., and separating the hydroxylamine-O-sulphonic acid so produced.

11. A process as defined in claim 10 wherein said separation of the hydroxylamine-O-sulphonic acid comprises mixing ethyl acetate with said second reaction mixture filtering said second reaction mixture and further washing the hydroxylamine-O-sulphonic acid filtrate with ethyl acetate.

12. A process as defined in claim 10 wherein said nitromethane-sulphuric acid reaction mixture is between about 90° and 100° C.

13. A process as defined in claim 12 wherein said period of time is between about 16 and 18 hours.

14. A process as defined in claim 10 wherein said unreacted nitromethane is separated by distillation with a maximum pot temperature of 140° C.

15. A process as defined in claim 10 wherein from about 1 to 1.5 moles of nitromethane are used per mole of sulphuric acid.

16. A process as defined in claim 15 wherein said second reaction mixture is rapidly cooled to below 5° C.

17. A process for the production of hydroxylamine-O-sulphonic acid comprising slowly adding, under essentially anhydrous conditions, nitromethane to a reaction medium consisting essentially of anhydrous sulphuric acid, said nitromethane being added in a mole ratio of 1 to 1.5 moles of nitromethane per mole of sulphuric acid at a temperature between about 75° and 140° C. and maintaining said temperature on said medium for from about 4 to 24 hours to produce a first reaction mixture containing hydroxylammonium acid sulphate, removing unreacted nitromethane from said reaction mixture, measuring the amount of nitromethane removed, cooling the remainder of the first reaction mixture to a temperature of from about 15° to 45° C., reacting sulphur trioxide, in an amount determined from the measured amount of nitromethane with the hydroxylammonium acid sulphate in said remainder of the first reaction mixture in a ratio of from about 1 to 2 moles of sulphur trioxide per mole of hydroxylammonium acid sulphate present in said remainder of the first reaction mixture to produce a second reaction mixture containing hydroxylamine-O-sulphonic acid, heating said second reaction mixture to about 95° C. for several hours with agitation, rapidly cooling said second reaction mixture to below 20° C., and separating crystalline hydroxylamine-O-sulphonic acid from said cooled second reaction mixture.

18. A process for the recovery of hydroxylamine-O-sulphonic acid from its admixture with sulphuric acid and its anhydrides comprising washing said hydroxylamine-O-sulphonic acid with ethyl acetate.

References Cited by the Examiner
UNITED STATES PATENTS 2,113,813 4/1938 Lippincott.
2,322,958 6/1943 Tryon.
3,066,011 11/1962 Agne.

OSCAR R. VERTIZ, *Primary Examiner.*

BENJAMIN HENKIN, *Examiner.*

R. M. DAVIDSON, A. GREIF, *Assistant Examiners.*